US012747698B2

(12) United States Patent
Holley et al.

(10) Patent No.: US 12,747,698 B2
(45) Date of Patent: Sep. 29, 2026

(54) INTEGRATED SURFACE TREATMENT FOR DRAG AND NOISE REDUCTION

(71) Applicant: RTX Corporation, Farmington, CT (US)

(72) Inventors: Brian M. Holley, Eastford, CT (US); Christopher T. Chipman, Brooklyn, CT (US); Daniel W. Shannon, Glastonbury, CT (US); Julian Winkler, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 228 days.

(21) Appl. No.: 18/615,460

(22) Filed: Mar. 25, 2024

(65) Prior Publication Data

US 2025/0297578 A1 Sep. 25, 2025

(51) Int. Cl.
*F02C 7/24* (2006.01)
*G10K 11/172* (2006.01)

(52) U.S. Cl.
CPC .............. *F02C 7/24* (2013.01); *G10K 11/172* (2013.01); *F05D 2230/13* (2013.01); *F05D 2260/963* (2013.01)

(58) Field of Classification Search
CPC ......... G10K 11/172; F02C 7/24; F02C 7/045; F05D 2230/13; F05D 2260/963; B64D 2033/0206; F02K 1/827
See application file for complete search history.

(56) References Cited

U.S. PATENT DOCUMENTS

| | | | | |
|---|---|---|---|---|
| 8,459,407 B2 * | 6/2013 | Jangili | F24F 13/24 | 181/224 |
| 9,273,631 B2 * | 3/2016 | Vavalle | B29C 70/865 | |
| 11,339,545 B2 * | 5/2022 | Hsu | E01F 8/0017 | |
| 11,434,819 B2 | 9/2022 | Murugappan et al. | | |
| 11,834,997 B2 | 12/2023 | Bifulco et al. | | |
| 2003/0141144 A1 * | 7/2003 | Wilson | F02K 1/827 | 181/292 |
| 2004/0016595 A1 * | 1/2004 | Andre | G10K 11/172 | 181/290 |
| 2018/0016987 A1 | 1/2018 | Howarth et al. | | |
| 2022/0161939 A1 * | 5/2022 | Porte | G10K 11/172 | |
| 2023/0154447 A1 | 5/2023 | Cariou | | |

OTHER PUBLICATIONS

European Search Report dated Sep. 1, 2025 issued in corresponding application EP25165460.4.

* cited by examiner

*Primary Examiner* — Jeremy A Luks
(74) *Attorney, Agent, or Firm* — Bachman & LaPointe, P.C.

(57) ABSTRACT

An aerodynamic component having an aerodynamic surface having a first side facing a fluid flow in a flow direction, and a second side opposed to the first side; at least one resonant cavity on the second side of the surface; at least one rib on the first side of the surface and aligned in the flow direction, the at least one rib extending away from the first side of the surface and defining channels on either side of the at least one rib; and at least one perforation connecting a channel on the surface with the at least one resonant cavity.

13 Claims, 6 Drawing Sheets

INTEGRATED SURFACE TREATMENT FOR DRAG AND NOISE REDUCTION

FIELD

The present disclosure relates to surface treatment of components, especially gas turbofan components such as turbofan nacelle ducts, to reduce noise and drag.

BACKGROUND

Acoustic treatment of aerodynamic surfaces such as turbofan nacelle ducts and the like typically comes with increased aerodynamic drag. This type of acoustic treatment generally takes the form of perforations in the aerodynamic surface that are in fluid communication, or have fluid, for example pneumatic, continuity to resonant cells beneath the surface. These treatments can be desirable due to the excessive noise that can be generated by high velocity fluid flow past the various surfaces of the turbofan.

Aerodynamic drag increases with form drag on the forward faces of the perforations. Skin friction, or drag on the surfaces between perforations, can increase or decrease depending upon the arrangement of the perforations, but it is typical that the form drag is the largest contributor. For this reason, the extent of acoustic treatment in practice is typically balanced with aerodynamic degradation.

SUMMARY OF THE DISCLOSURE

In one non-limiting embodiment, an aerodynamic component, comprises an aerodynamic surface having a first side facing a fluid flow in a flow direction, and a second side opposed to the first side; at least one resonant cavity on the second side of the surface; at least one rib on the first side of the surface and aligned in the flow direction, the at least one rib extending away from the first side of the surface and defining channels on either side of the at least one rib; and at least one perforation connecting a channel on the surface with the at least one resonant cavity.

In a non-limiting configuration, the at least one perforation comprises a plurality of perforations having a diameter between 10 and 1,000 microns.

In a further non-limiting configuration, the at least one perforation has an oblong shape.

In a still further non-limiting configuration, the oblong shape is oriented with a long dimension aligned with the flow direction.

In another non-limiting configuration, the at least one perforation is configured to provide open area in the surface of at least 1%.

In still another non-limiting configuration, the open area is between 4 and 20%.

In a further non-limiting configuration, the component is selected from the group consisting of a turbofan nacelle duct, a blade surface, a vane surface and a wing.

In a still further non-limiting configuration, the at least one rib comprises a plurality of substantially parallel ribs defining the channels therebetween.

In another non-limiting configuration, the plurality of substantially parallel ribs have a lateral spacing, defining the channels, of between 10 microns and 1,000 microns.

In still another non-limiting configuration, the at least one rib has a height of between 10 microns and 1,000 microns.

In a further non-limiting configuration, the at least one perforation extends laterally across a width of the channel.

In another non-limiting embodiment, a method is provided for making a component having a surface treatment on an aerodynamic surface, the method comprising forming a plurality of ribs on a first side of the aerodynamic surface, the first side being configured to face a fluid flow, the ribs extending away from the first side and defining channels therebetween, and the aerodynamic surface further having a second side opposed to the first side, and at least one resonant cavity on the second side; forming at least one perforation through the aerodynamic surface from the first side to the second side and communicated with the at least one resonant cavity.

In a non-limiting configuration, the step of forming the at least one perforation comprises ultraviolet laser drilling to form the at least one perforation.

In another non-limiting configuration, the at least one perforation is formed having a diameter of between 10 and 1,000 microns.

In still another non-limiting configuration, the step of forming the at least one perforation comprises forming the at least one perforation through the aerodynamic surface at the channels.

The foregoing features and elements may be combined in various combinations without exclusivity, unless expressly indicated otherwise. These features and elements, as well as the operation thereof, will become more apparent in light of the following description and the accompanying drawings. It should be appreciated that the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination. Additionally, any reference to without contact (or similar phrases) may also include reduced contact or minimal contact. It should also be understood that unless specifically stated otherwise, references to "a", "an", or "the" may include one or more than one and that reference to an item in the singular may also include the item in the plural. Further, all ranges may include upper and lower values and all ranges and ratio limits disclosed herein may be combined.

This disclosure relates to treatment of acoustic surfaces to reduce noise and drag along the surface. Such surfaces include those that encounter high velocity fluid flow such as, in one non-limiting example, surfaces of turbofans such as turbofan nacelle ducts and the like.

Figure 1:
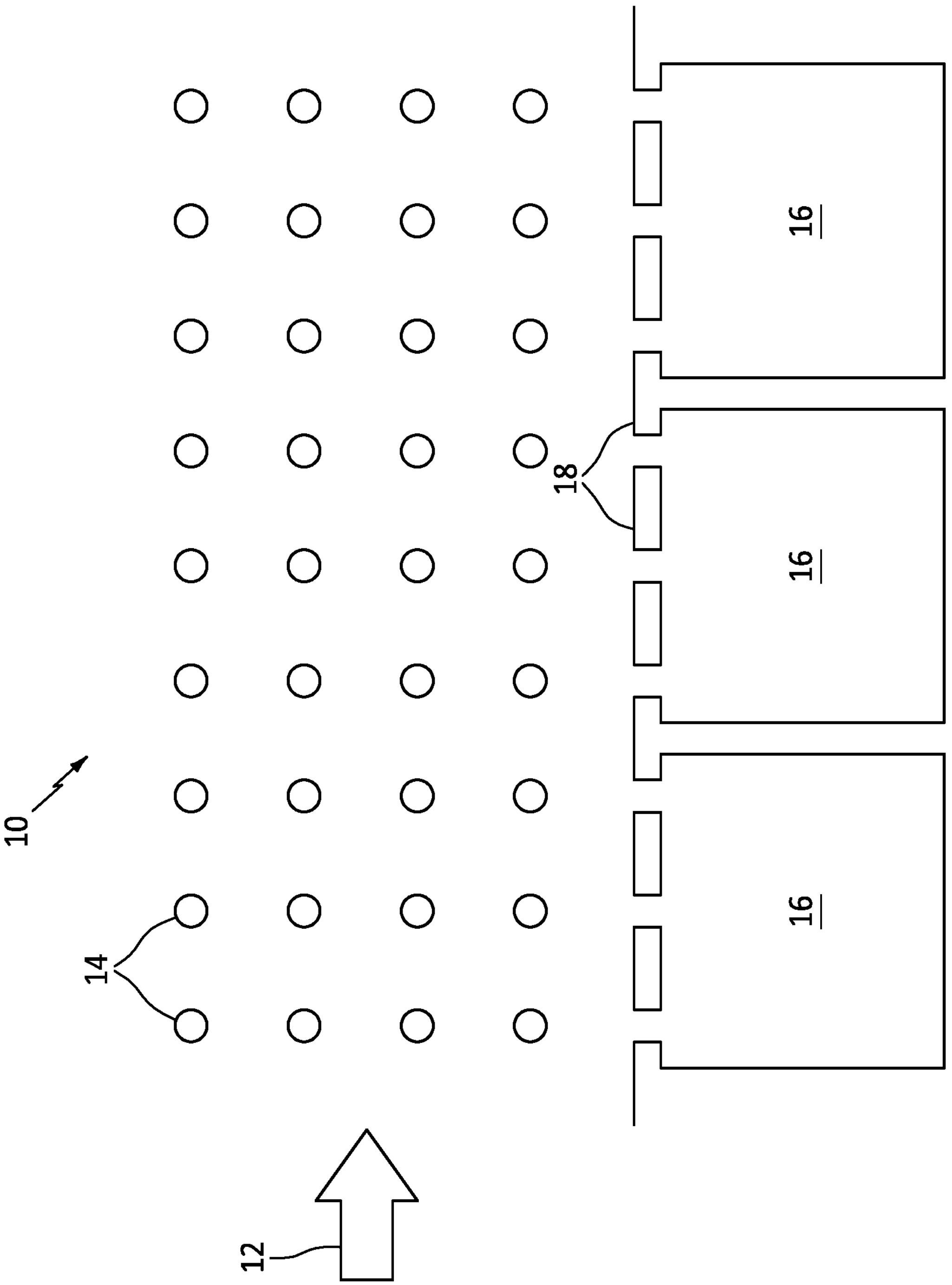
FIG. 1 illustrates use of surface perforations and resonant cavities for acoustic treatment.

FIG. 1 schematically illustrates such a surface 10 and flow 12 which would pass along surface 10 during operation of the turbofan. As shown, surface 10 can have a plurality of surface perforations 14 which can be distributed along surface 10 and be in fluid communication, or may have fluidic, for example pneumatic, continuity with one or more resonant cavities 16 (schematically illustrated in the lower portion of FIG. 1) to help reduce noise generated by flow somewhere within the engine which then propagates away from that source region to the flow 12 in the area of the acoustic treatment as disclosed herein. As mentioned above, perforations 14 can cause potentially significant form drag, which is drag created by forward or flow facing surfaces 18 of perforations 14. While other aspects of surface 10 can also cause drag, such as for example frictional drag, form drag caused by surfaces 18 is generally the most significant drag caused by this configuration.

It should be noted that surface 10 will have one side facing toward the flow 12 and along which the flow passes, and an opposed side facing away from flow 12 and facing toward resonant cavities 16. Perforations 14 pass through surface 10 from the flow side to the opposed, resonant cavity side such that flow 12 is in fluid communication through perforations 14 to resonant cavities 16. Thus, perforations 14 pass across a thickness of surface or wall 10, or in other words traverse laterally cross surface 10 from the one side to the other side of the surface. Further, it will be understood that in some references to surface 10, what will be meant is a wall having a thickness and defining both the flow facing and opposed facing sides.

Figure 2:
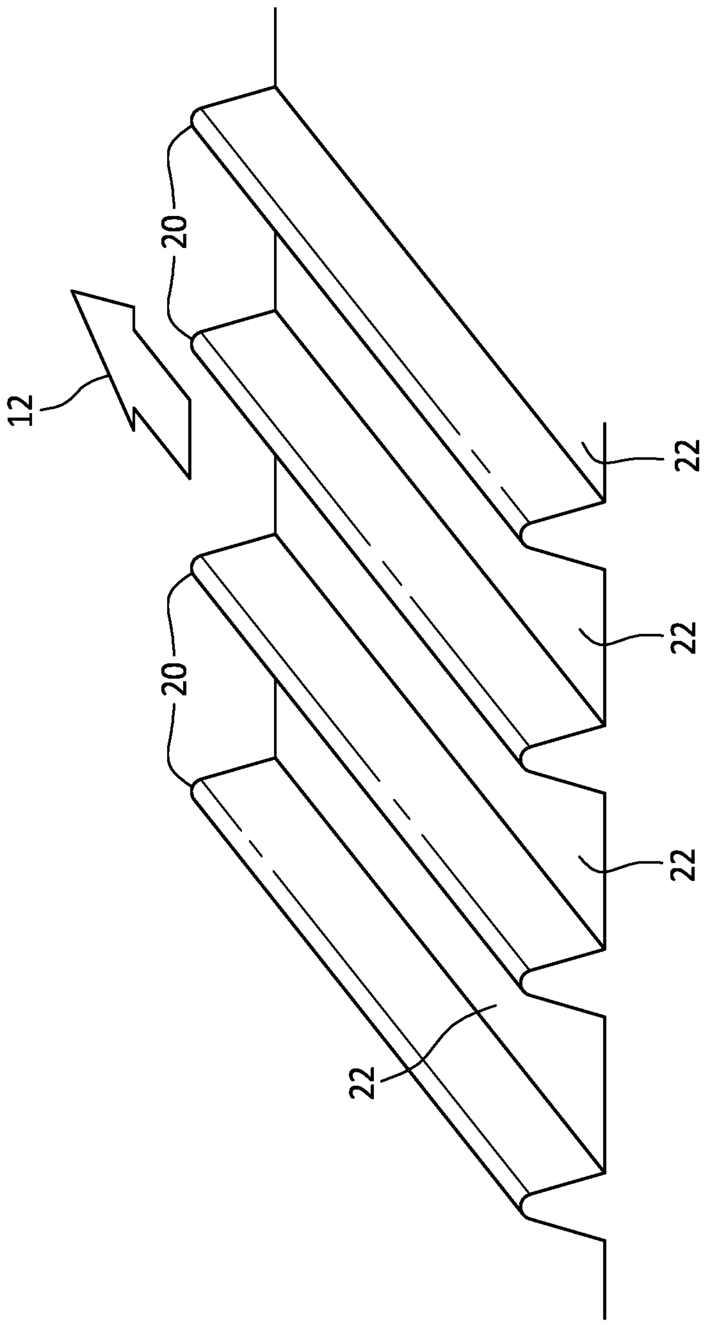
FIG. 2 illustrates a rib surface treatment.

In order to reduce form drag caused by apertures or perforations, surface features can be utilized to influence flow along surface 10. FIG. 2 shows one such surface feature in the form of ribs or riblets 20 positioned along surface 10 and extending along a direction of flow 12. Ribs 20 positioned in this manner define channels 22 therebetween which also extend along the direction of flow 12. In this configuration, and as further discussed below, ribs 20 influence the flow profile along surface 10 such that reduced velocity flow is experienced along channels 22. Further, the shape or cross section of ribs 20 can impact the flow profile.

Figure 4:
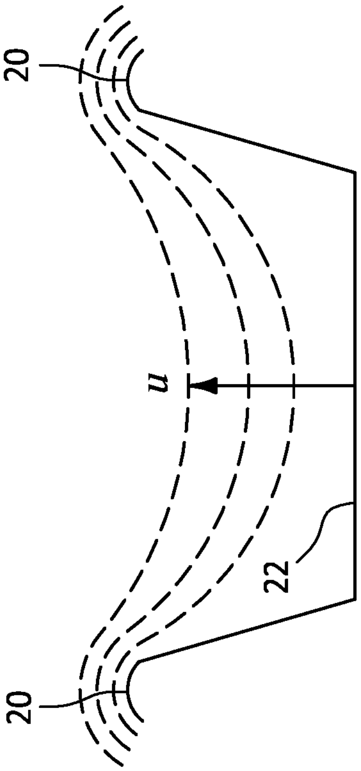
FIG. 4 illustrates flow along a rib and channel surface having a wedge shape.
Figure 3:
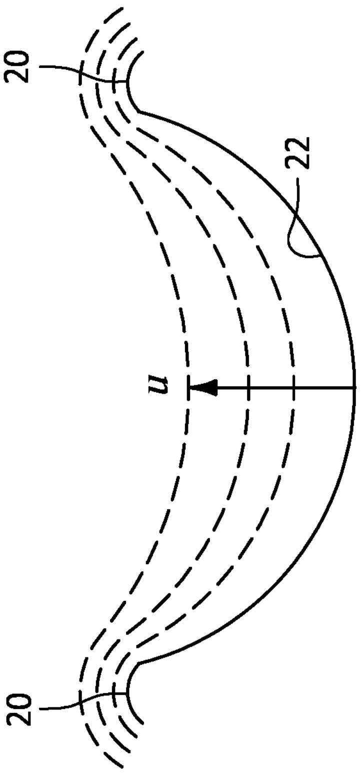
FIG. 3 illustrates flow along a rib and channel surface having a scallop shape.

FIGS. 3 and 4 illustrate flow profiles for two different shapes of ribs. In either case, it should be appreciated that ribs are structures which extend upwardly from a surface along which fluid flow takes place, particularly fluid flow carrying noise which can be reduced with suitable acoustic surface treatments. Between the ribs 20, a space or valley is defined as discussed further below. Further, ribs 20 extend longitudinally generally in the direction of the flow. In FIG. 3, ribs 20 have a rounded or scallop shape, such that channels 22 are rounded along an entire lateral cross-section. In FIGS. 3 and 4, the broken lines illustrate iso-contours of flow velocity, which increases with distance from the surface. As shown, in FIG. 3 the velocity profile bends along the curved surfaces, with a lower velocity established along the surface of channels 22 and a higher velocity established along the upper surface of the ribs. In FIG. 4, ribs 20 are more angular such that corners are defined between channels 22 and ribs 20. It can be seen that the velocity profile is somewhat elevated as compared to FIG. 3, with potentially lower flow velocity areas defined along corners between ribs 20 and channels 22. In both instances, however, a reduced velocity profile is established along the surfaces of channel 22. In FIGS. 3 and 4, u represents iso-contours of velocity, and it is noted that this value increases with distance from the flow surface.

Figure 5:
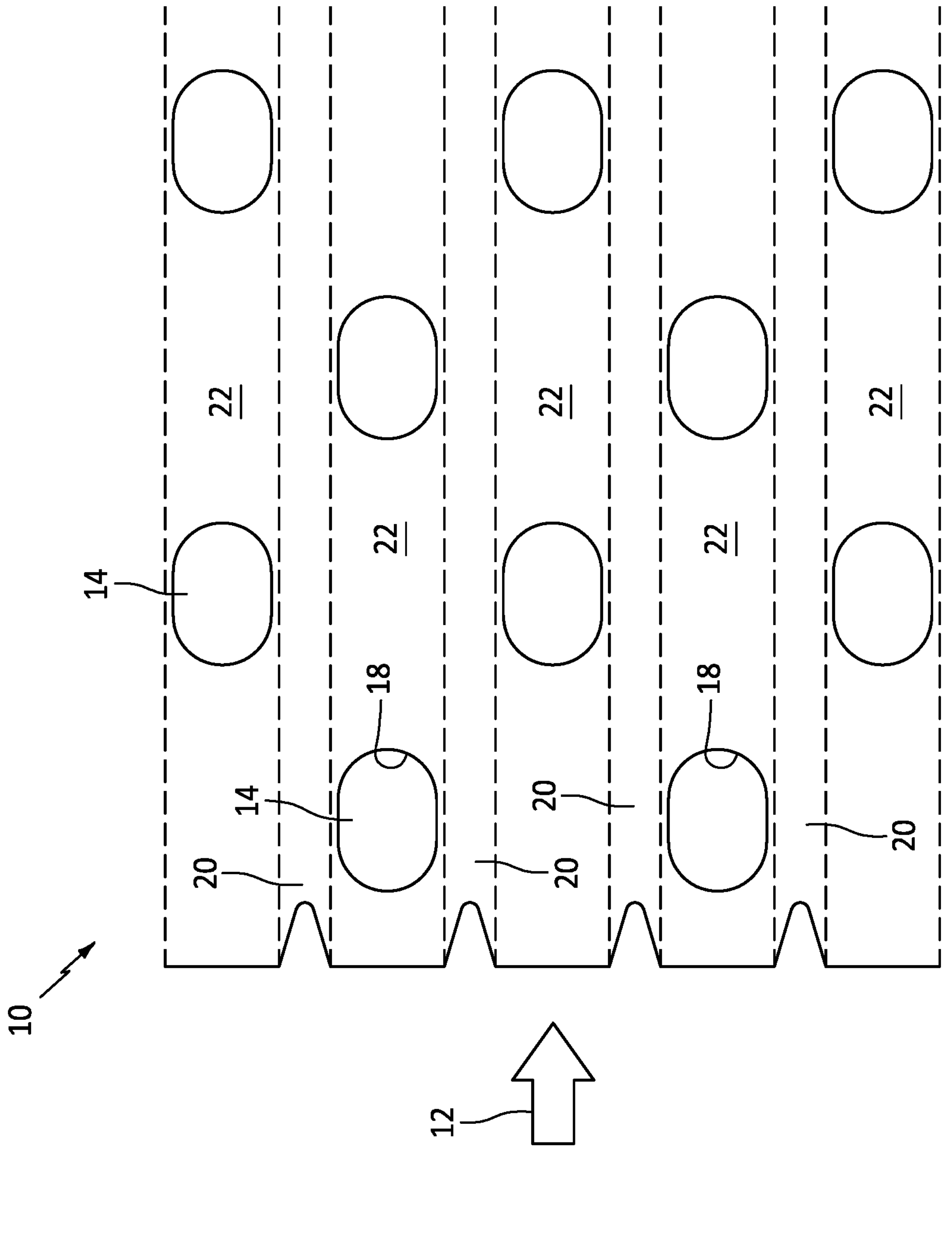
FIG. 5 is a top view of an aerodynamic surface having ribs and perforations in channels between the ribs.

FIG. 5 illustrates a non-limiting configuration combining ribs 20 defining channels 22 in a direction of flow 12 and perforations 14 formed along channels 22. This places perforations 14 at a location where flow velocity is reduced (See FIGS. 3 and 4), which leads to a reduction in form drag caused by the perforation 14 since the perforations operate in regions of lower velocity gradients. As with the configuration shown in FIG. 1, perforations 14 are in fluid communication with resonant cavities (not shown in FIG. 5) which serve to reduce noise caused by flow along surface 10.

In one non-limiting configuration, ribs 20 can have a height, measured from a floor or bottom level of channels 22, of between 10 microns and 1,000 microns. Further, spacing between ribs 20, laterally with respect to direction of flow 12, can be between 10 microns and 1,000 microns.

FIG. 5 shows perforations 14 having an elongated or oblong shape, with the longer dimension of the shape in this configuration being aligned with the direction of flow 12. This shape of perforation can be advantageous as it increases the amount of open area for access to resonant cavities without necessarily increasing the number of perforations.

Perforations 14 can, in one non-limiting configuration, have a dimension or diameter of between 10 and 1,000 microns, and in some non-limiting configurations this range can be between 10 and 100 microns. This dimension can be other than a diameter because it is possible for perforations to have other shapes. For example, perforations can be triangular, or can be in the form of a slot, or numerous other shapes.

In order to provide suitable acoustic treatment or noise reduction, it can be useful to have perforations cover at least about 1% of the flow surface area, defining at least 1% POA (percent open area) on which they are positioned. As a further non-limiting example, the percent open area can be between 4 and 20%.

With perforations of the size discussed herein, it may be useful to form such perforations by laser, for example using a precision method such as ultraviolet laser drilling and the like. Water jet guided lasers can be useful for this step as well. In this configuration, the method for making the treated surface can include making the surface with ribs and channels. This structure can then be assembled to resonant cavities or can be fabricated together with the resonant cavities. In any event, once this is complete, perforations can then be made, for example using laser precision drilling, to ensure that the perforations are in proper locations to communicate with underlying resonant cavities.

Figure 6:
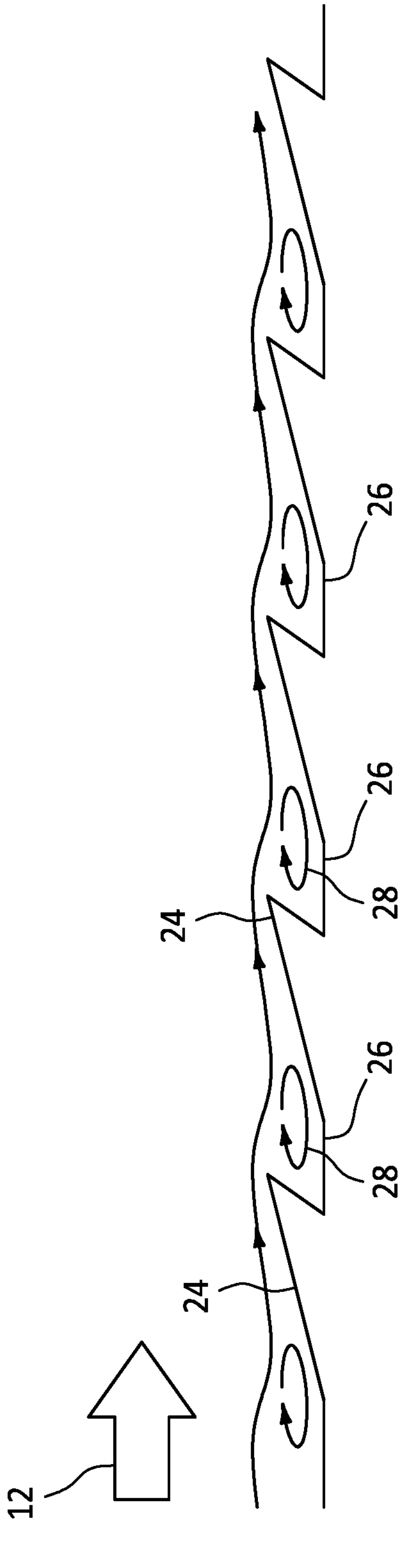
FIGS. 6 and 7 illustrate features of a sharkskin configuration of an acoustic treatment.
Figure 7:
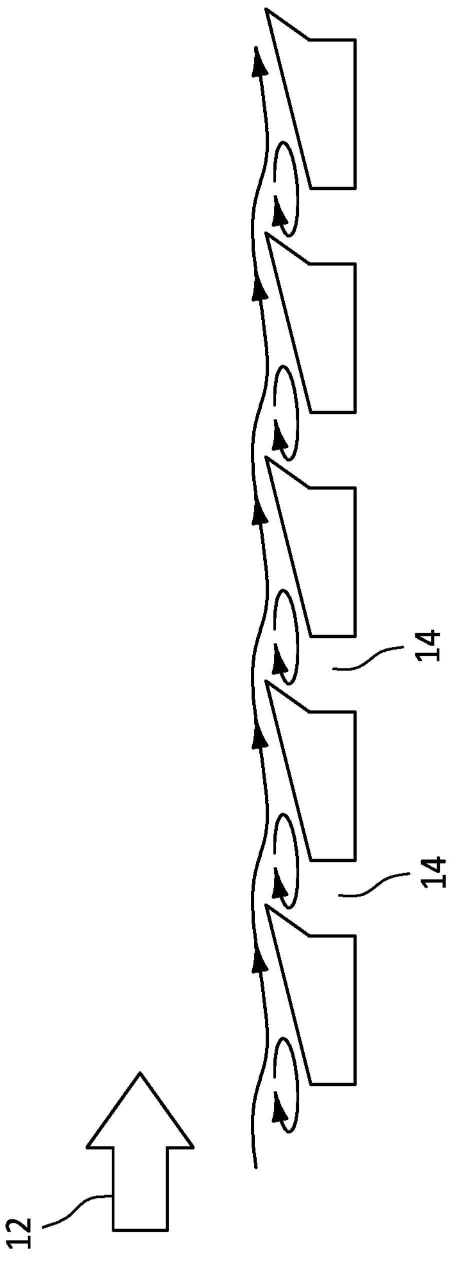

FIGS. 6 and 7 illustrate another form of surface treatment in the form of a sharkskin structure wherein a series of flow elevations 24 are separated by depressions, alternating in the flow direction. Common aspects between both (sharkskin and ribs) is that they provide local regions of low velocity and lower velocity gradient where placement of perforates for acoustic treatment is favorable.

FIG. 6 shows how such a structure functions. In a direction of flow 12, a series of gradual elevations 24 followed by a depression 26 can be established in series in the direction of flow such that flow, as shown, is lifted by the elevations 24 and creates relatively low velocity regions 28 downstream of the elevations 24. FIG. 7 shows how this structure can be combined with apertures or perforations 14 to create fluid communication or continuity with one or more resonant cavities as desired.

Figure 8:
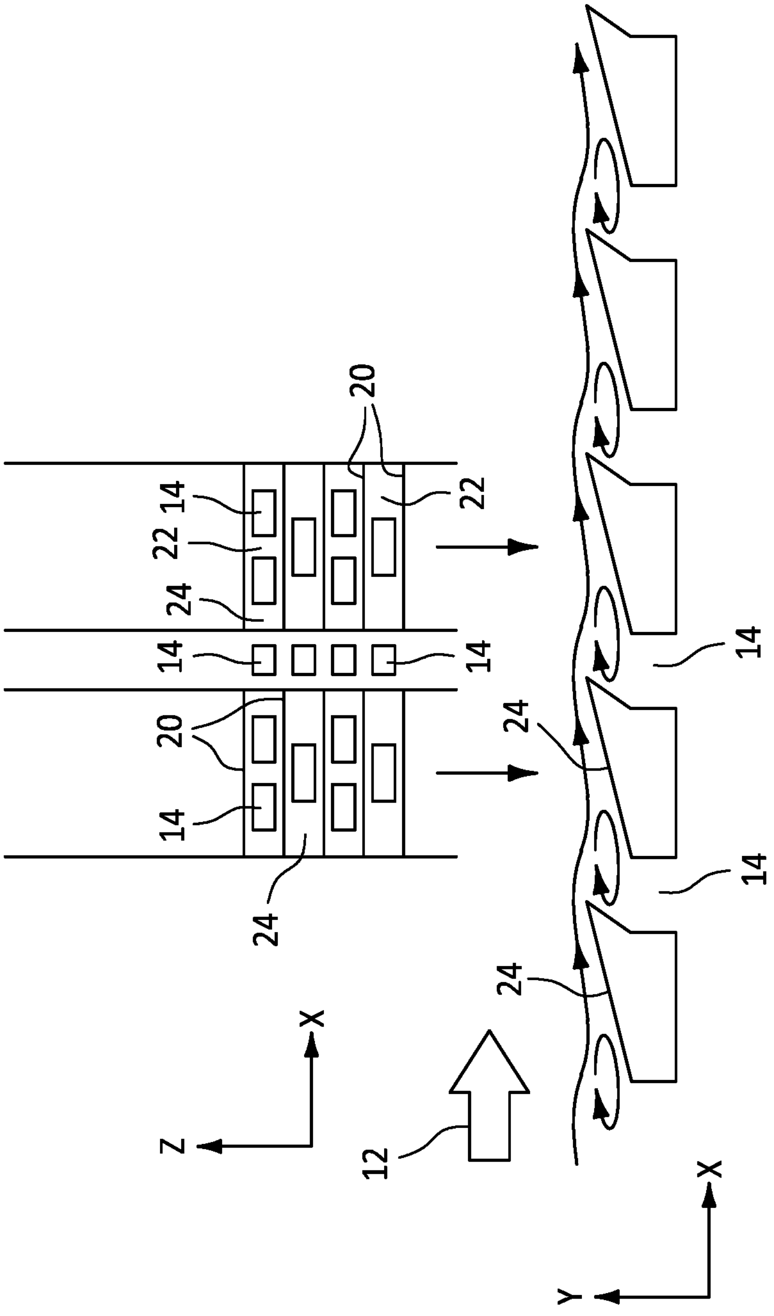
FIG. 8 illustrates a combined acoustic treatment having both ribs and sharkskin configuration.

In one non-limiting configuration, the sharkskin acoustic treatment of FIGS. 6 and 7 can be combined with the rib acoustic treatment of FIG. 5. FIG. 8 shows such a structure in a side view similar to that of FIG. 7 and also a rotated top view to further illustrate position of apertures 14 and ribs 20, FIG. 8 is further described below.

FIG. 8 shows a flow surface with a series of elevations 24 having ribs 20 defined on them, thereby presenting a combination of acoustic treatments on the surface. Thus, each elevation 24 has a plurality of ribs 20 defined thereon, and is followed by a depression 26 and perforations 14 in the depression. This is in addition to perforations 14 already positioned along channels 22 defined between ribs 20 as discussed above. This combination of different acoustic treatments can provide an even greater noise reduction, while still minimizing form drag.

It should be appreciated that although ribs, channels and perforations are shown herein in configurations where the ribs are straight, parallel and uniform, the ribs can be configured to change spatially in size and spacing as can the perforations, for example in size, spacing, POA, to adapt to the local flow, for example the local Reynolds number. These features can be located on straight or curved surfaces. Further, the underlying resonant cavities can also change as a function of space and the like.

Further, the surface to be treated with the acoustic treatments disclosed herein can suitable be selected from the group consisting of a turbofan nacelle duct, a blade surface, a vane surface and a wing, as well as any other structure which in operation will have a flow passing a surface and carrying a noise which is desirable to be reduced. Under such circumstances, the acoustic treatments disclosed herein can be disposed along such a surface such that noise can be reduced without creating significant drag as desired.

The foregoing description is exemplary of the subject matter of the subject matter disclosed herein. Various non-limiting embodiments are disclosed, however, one of ordinary skill in the art would recognize that various modifications and variations in light of the above teachings will fall within the scope of the appended claims. It is therefore to be appreciated that within the scope of the appended claims, the disclosure may be practiced other than as specifically described. Thus, the scope of the present claims is not specifically limited by the details of specific embodiment disclosed herein, but rather the claims define the full and reasonable scope of the disclosure.

We claim:

1. An aerodynamic component, comprising:

an aerodynamic surface having a first side facing a fluid flow in a flow direction, and a second side opposed to the first side;

at least one resonant cavity on the second side of the surface;

a plurality of substantially parallel ribs on the first side of the surface and aligned in the flow direction, the plurality of substantially parallel ribs extending away from the first side of the surface and defining a plurality of channels therebetween which also extend along the flow direction, wherein the plurality of substantially parallel ribs are configured to influence a flow profile along the aerodynamic surface such that reduced velocity flow is experienced along surfaces of the channels; and a plurality of perforations connecting a channel of the plurality of channels with the at least one resonant cavity, wherein the plurality of perforations extend laterally across a width of the channel at a location where flow velocity is configured to be reduced.

2. The component of claim 1, wherein the plurality of perforations have a diameter between 10 and 1,000 microns.

3. The component of claim 1, wherein the plurality of perforations have an oblong shape.

4. The component of claim 3, wherein the oblong shape is oriented with a long dimension aligned with the flow direction.

5. The component of claim 1, wherein the plurality of perforations are configured to provide open area in the surface of at least 1%.

6. The component of claim 5, wherein the open area is between 4 and 20%.

7. The component of claim 1, wherein the component is selected from the group consisting of a turbofan nacelle duct, a blade surface, a vane surface and a wing.

8. The component of claim 1, wherein the plurality of substantially parallel ribs have a lateral spacing, defining the channels, of between 10 microns and 1,000 microns.

9. The component of claim 1, wherein the plurality of ribs have a height of between 10 microns and 1,000 microns.

10. A method for making a component having a surface treatment on an aerodynamic surface, the method comprising:

forming a plurality of substantially parallel ribs on a first side of the aerodynamic surface, the first side being configured to face a fluid flow, the plurality of substantially parallel ribs extending away from the first side and defining channels aligned in a flow direction therebetween, the plurality of substantially parallel ribs being configured to influence a flow profile along the aerodynamic surface such that reduced velocity flow is experienced along surfaces of the channels, and the aerodynamic surface further having a second side opposed to the first side, and at least one resonant cavity on the second side;

forming a plurality of perforations in a channel of the channels, through the aerodynamic surface from the first side to the second side and communicated with the at least one resonant cavity, the plurality of perforations extending laterally across a width of the channel at a location where flow velocity is configured to be reduced.

11. The method of claim 10, wherein the step of forming the plurality of perforations comprises ultraviolet laser drilling to form the plurality of perforations.

12. The method of claim 10, wherein the plurality of perforations are formed having a diameter of between 10 and 1,000 microns.

13. The method of claim 10, wherein the step of forming the plurality of perforations comprises forming the plurality of perforations through the aerodynamic surface at the channels.

* * * * *